（12）United States Patent
Beauchamp

(10) Patent No.: US 10,773,305 B2
(45) Date of Patent: Sep. 15, 2020

(54) THREE DIMENSIONAL PRINTING SYSTEM WITH EFFICIENT POWDER HANDLING SYSTEM

(71) Applicant: 3D Systems, Inc., Rock Hill, SC (US)

(72) Inventor: Robert Beauchamp, Carlsbad, CA (US)

(73) Assignee: 3D Systems, Inc., Rock Hill, SC (US)

( * ) Notice: Subject to any disclaimer, the term of this patent is extended or adjusted under 35 U.S.C. 154(b) by 278 days.

(21) Appl. No.: 15/838,449

(22) Filed: Dec. 12, 2017

(65) Prior Publication Data
US 2018/0185915 A1 Jul. 5, 2018

Related U.S. Application Data

(60) Provisional application No. 62/440,151, filed on Dec. 29, 2016.

(51) Int. Cl.
*B22F 3/105* (2006.01)
*B33Y 30/00* (2015.01)
*B33Y 50/02* (2015.01)
*B33Y 40/00* (2020.01)
(Continued)

(52) U.S. Cl.
CPC .......... *B22F 3/1055* (2013.01); *B29C 64/329* (2017.08); *B29C 64/357* (2017.08); *B33Y 30/00* (2014.12); *B33Y 40/00* (2014.12); *B33Y 50/02* (2014.12); *B22F 2003/1057* (2013.01); *B22F 2003/1059* (2013.01); *B22F 2201/20* (2013.01);
(Continued)

(58) Field of Classification Search
CPC ........ B22F 3/1055; B33Y 30/00; B33Y 40/00
See application file for complete search history.

(56) References Cited

U.S. PATENT DOCUMENTS

| 5,800,579 | A | * | 9/1998 | Billingsley | ............ B01D 45/16 55/337 |
| 8,185,229 | B2 | | 5/2012 | Davidson | |
| 9,533,452 | B2 | | 1/2017 | Guenster et al. | |

(Continued)

FOREIGN PATENT DOCUMENTS

| CN | 2355811 | 12/1999 |
| CN | 2355811 Y * | 12/1999 |

(Continued)

OTHER PUBLICATIONS

PCT International Search Report of the International Searching Authority for PCT/US2017/065677, dated Jun. 11, 2018 (8 pages).
(Continued)

*Primary Examiner* — Jacob T Minskey
*Assistant Examiner* — Melody Tsui

(57) ABSTRACT

A three dimensional (3D) printing system includes a print engine, a first powder handling module, a sieve, a second powder handling module, and a controller. The controller operates the print engine to fabricate 3D articles of manufacture. The controller operates the first powder handling module to transfer excess powder from the print engine to the first powder handling module and to receive new powder. The first powder handling module dispenses powder to the sieve. The controller operates the second handling module to transfer powder from the sieve to the second powder handling module. The second powder handling module provides powder to the print engine.

9 Claims, 4 Drawing Sheets

(51) Int. Cl.
*B29C 64/357* (2017.01)
*B29C 64/329* (2017.01)

(52) U.S. Cl.
CPC ......... *B22F 2202/17* (2013.01); *Y02P 10/295* (2015.11)

(56) References Cited

U.S. PATENT DOCUMENTS

| | | | |
|---|---|---|---|
| 2009/0223873 A1 | 9/2009 | Mueller et al. | |
| 2016/0059310 A1* | 3/2016 | Junker | B29C 64/364 |
| | | | 419/53 |
| 2016/0193696 A1 | 7/2016 | McFarland et al. | |
| 2016/0200053 A1 | 7/2016 | Chen et al. | |
| 2016/0271885 A1 | 9/2016 | Shi et al. | |
| 2016/0271887 A1 | 9/2016 | Shi et al. | |
| 2018/0021855 A1* | 1/2018 | De Lajudie | B33Y 10/00 |
| | | | 419/26 |

FOREIGN PATENT DOCUMENTS

| | | | | |
|---|---|---|---|---|
| DE | 102006055326 | | 5/2008 | |
| DE | 102006055326 A1 * | | 5/2008 | ........... B29C 64/153 |
| DE | 102013215748 | | 2/2015 | |
| DE | 102013215748 A1 * | | 2/2015 | ............ B22F 3/1055 |
| DE | 102015109846 | | 12/2016 | |
| DE | 102015109846 A1 * | | 12/2016 | ......... B01D 46/2411 |
| EP | 2052845 | | 6/2011 | |
| EP | 2992942 | | 3/2016 | |
| FR | 3032637 | | 8/2016 | |
| WO | 2017194144 | | 11/2017 | |
| WO | 2017196336 | | 11/2017 | |
| WO | WO-2017194144 A1 * | | 11/2017 | ........... B29C 64/141 |

OTHER PUBLICATIONS

PCT Written Opinion of the International Searching Authority for PCT/US2017/065677, dated Jun. 11, 2018 (14 pages).

PCT Partial International Search Report and Provisional Opinion Accompanying the Partial Search Report for PCT Application No. PCT/US2017/065677, dated Apr. 17, 2018 (20 pages).

* cited by examiner

THREE DIMENSIONAL PRINTING SYSTEM WITH EFFICIENT POWDER HANDLING SYSTEM

CROSS REFERENCE TO RELATED APPLICATIONS

This non-provisional patent application claims priority to U.S. Provisional Application Ser. No. 62/440,151, Entitled "Three Dimensional Printing System with Efficient Powder Handling System" by Robert Beauchamp, filed on Dec. 29, 2016, incorporated herein by reference under the benefit of U.S.C. 119(e).

FIELD OF THE INVENTION

The present disclosure concerns an apparatus and method for the digital fabrication of three dimensional (3D) articles utilizing powder materials. More particularly, the present disclosure concerns a very efficient powder handling system and method that is particularly advantageous in the handling of metal powers and other hazardous particulate matter.

BACKGROUND

Three dimensional (3D) printers are in widespread use. Examples of 3D printer technologies includes stereolithography, selective laser sintering, selective laser melting, and fused deposition modeling to name a few. Selective laser melting based printers utilize high powered energy sources to melt and fuse metallic powders. The high energy sources can be based on high powered lasers or electron beams.

One challenge with selective laser melting printers is powder handing. Fine metallic powder can ignite under certain conditions and may thus present a hazard. To avoid this hazard, the selective laser melting printers utilize an inert atmosphere such as argon or nitrogen to surround the powder. Metallic powders can also be health hazards. Thus containment of the powders is an important consideration.

Another challenge is maintenance of powder handling systems. Typically filters are used to prevent any powder from leaving a powder handling system. Filter cost and replacement frequency is an important cost of operating selective laser melting systems.

What is desired is a powder handling system that efficiently and effectively moves powder to and from selective laser melting printer engines. It is also desired to minimize filter replacement.

SUMMARY

Figure 1:
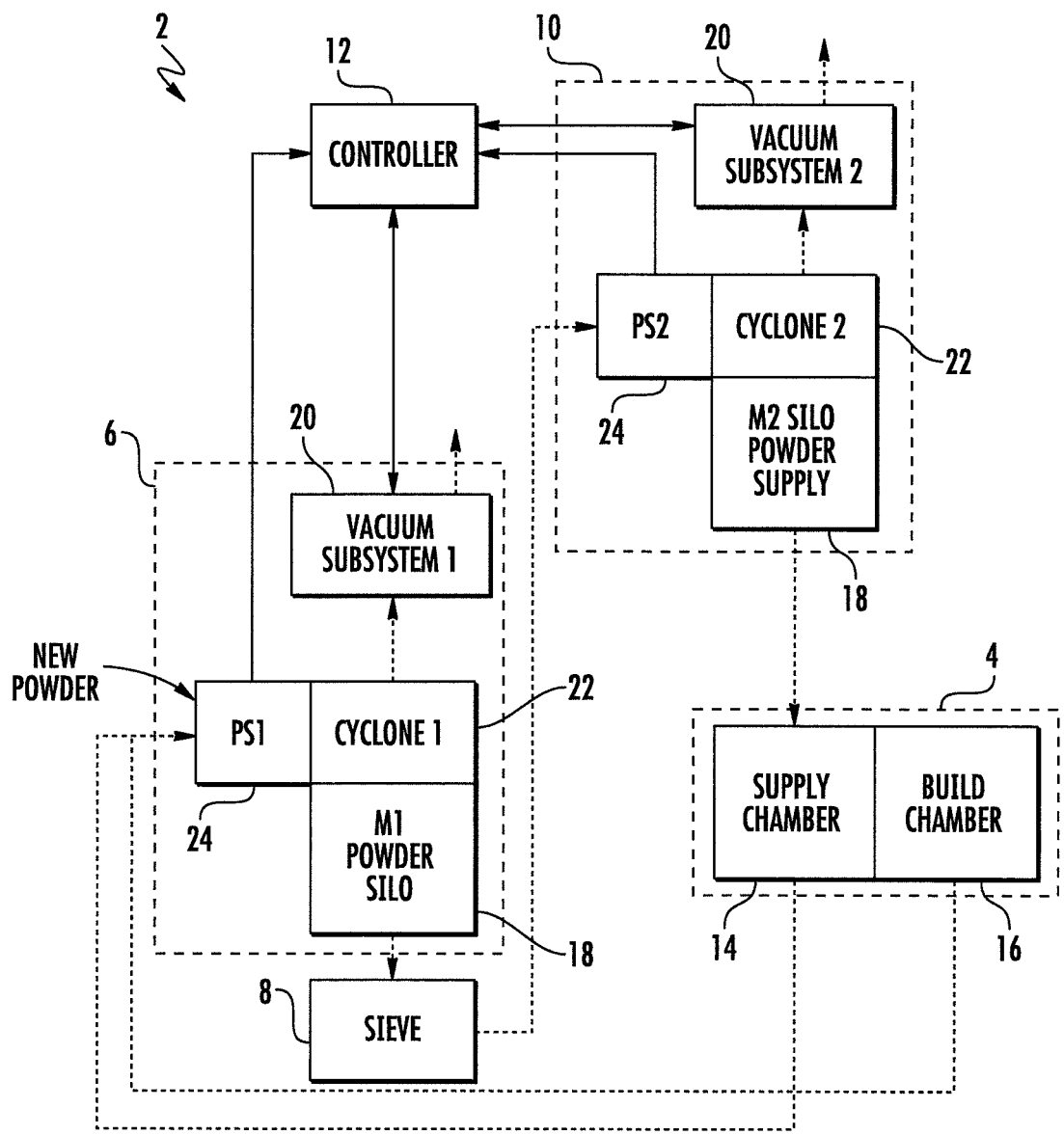
FIG. 1 is a block diagram of a three dimensional (3D) printing system depicting a novel powder handling system.

In a first aspect of the disclosure, a three dimensional (3D) printing system includes a print engine, a first powder handling module, a sieve, a second powder handling module, and a controller. The controller operates the print engine to fabricate 3D articles of manufacture. The controller operates the first powder handling module to transfer excess powder from the print engine to the first powder handling module and to receive new powder. The first powder handling module dispenses powder to the sieve. The controller operates the second handling module to transfer powder from the sieve to the second powder handling module. The second powder handling module provides powder to the print engine.

In one implementation the print engine includes a powder supply chamber that provides powder to a build chamber. The powder supply chamber is replenished by the second powder handling module. Excess powder from the powder supply chamber and the build chamber are received by the first powder handling module.

In another implementation each powder handling module (first or second) includes a vacuum subsystem and a silo. The silo includes a powder separator and a pressure sensor. The vacuum subsystem generates a gaseous flow that drives the transfer of powder into the powder handling module. The gaseous flow contains fluidically entrained powder that is then separated by the powder separator and directed into the silo. The controller is coupled to the pressure sensor and to the vacuum subsystem. The controller controls the vacuum subsystem in response to signals received from the pressure sensor. In one embodiment the controller maintains a gas flow velocity of at least 20 meters per second for transferring the powder to the powder handling module.

In yet another implementation the controller includes a processor coupled to an information storage device. The information storage device includes a non-transient and/or non-volatile storage device that stores instructions, that when executed by the processor, control the print engine and the vacuum subsystem. The control of the vacuum subsystem is responsive to a signal from at least one pressure sensor. The instructions may receive other inputs and control other subsystems as well. The controller may be integrated onto a single chip device or it may be distributed among a plurality of devices in the printing system.

In a second aspect of the disclosure, a three dimensional printing system includes a silo for handling powder, a vacuum subsystem, and a controller. The silo includes an upper silo portion for receiving powder entrained in a gaseous stream, a pressure sensor, a vacuum outlet, and a cyclonic powder separator for removing powder from the gaseous stream whereby it exits from the powder separator in a downward direction. The vacuum subsystem is coupled to the vacuum outlet. The controller is coupled to the pressure sensor and the vacuum subsystem, the controller configured to receive a signal from the pressure sensor and to operate the vacuum subsystem to maintain a proper flow rate of the gaseous stream to prevent clogging of the printing system and to maximize transfer of the powder from the gaseous stream to the silo. In one embodiment, the pressure sensor is disposed to monitor the pressure within the powder separator.

In one implementation the powder separator includes an upper separator portion, a lower separator portion that tapers downwardly from the upper portion, a powder receiving inlet that couples the gaseous stream to the upper separator portion and wherein the vacuum outlet exits from the upper separator portion. In one embodiment the upper separator portion includes a downwardly extending shroud that separates the powder receiving inlet from the vacuum outlet to minimize powder that exits through the vacuum outlet. In another embodiment the powder receiving inlet includes a first portion that has a first inside diameter and a second portion that has a second inside diameter that is greater than the first inside diameter to slow down the velocity of the powder as it is transported through the powder receiving inlet.

In a third aspect of the disclosure, a 3D printing system includes a silo, a vacuum subsystem, and a controller. The silo includes an upper silo portion and a lower silo portion. The upper silo portion includes a powder separator. The powder separator includes: an upper separator portion with a downwardly extending shroud that separates an outer annular cavity from an inner circular cavity, a powder receiving inlet coupled to the outer annular cavity whereby incoming power circulates around the shroud, a vacuum outlet coupled to the inner circular cavity whereby the shroud protects the vacuum outlet from the circulating powder, and a lower separator portion that tapers downwardly from the upper separator portion and having a lower outlet from which the circulating powder exits. The lower silo portion receives and holds powder from the lower outlet of the powder separator. The vacuum subsystem is coupled to the vacuum outlet. The controller is configured to control the vacuum subsystem to control the rate of gaseous flow that entrains the powder and delivers it to the powder separator. In a preferred embodiment the shroud extends downwardly by a distance at least equal to a majority of a vertical height of the upper separator portion.

In one implementation the upper silo portion is closed by a lid and the powder separator is mounted to the lid.

In another implementation a pressure sensor is mounted to monitor a pressure in the upper portion of the powder separator, the controller utilizes a signal from the pressure sensor to control the vacuum subsystem to thereby control a gaseous flow rate out of the vacuum outlet.

In yet another embodiment the powder receiving inlet includes a first portion having a first inside diameter and a second portion having a second inside diameter that is greater than the first diameter, the velocity of the powder is reduced as it progresses from the first portion to the second portion of the powder receiving inlet.

DETAILED DESCRIPTION OF THE PREFERRED EMBODIMENTS

FIG. 1 is schematic block diagram of a three dimensional (3D) printing system 2 that has a novel system for handling powder that is particularly advantageous for handling metal powder. In this block diagram, a fluidic movement of powder through conduits (e.g., flexible hoses) is be depicted by dashed lines. Moving powder is entrained by a gaseous stream passing through a conduit. Preferably the gas velocity through each conduit is at least about 20 meters per second to properly entrain the powder. In this diagram, thinner black lines depict electrical or wireless connections between system components. For illustrative simplicity not all couplings, whether fluidic or electrical or wireless, are shown.

3D printing system 2 includes a print engine 4 for fabricating 3D articles of manufacture through the binding and/or fusion of powder. A first powder handling module 6 receives new powder and/or excess powder from print engine 4. First powder handling module 6 delivers the powder to a sieve 8. A second powder handling module 10 receives powder from sieve 8 and delivers the powder to print engine 4. A controller 12 is electrically and/or wirelessly coupled to print engine 4, first powder handling module 6, and second powder handling module 10. Controller 12 may be coupled to other components that are not shown.

Print engine 4 includes a supply chamber 14 that provides layers of powder to a build chamber 16. The build chamber 16 includes a means of fusing or binding the powder (not shown). In one embodiment a means of fusing is a high powered beam generator (laser and/or electron beam) for selectively fusing metal powder. In some embodiments the supply chamber 14 can be two supply chambers 14 with one disposed on each side of the build chamber 16 or a single chamber that extends around all four sides of build chamber 16. Excess and/or used powder from supply chamber 14 and build chamber 16 is transferred to first powder handling module 6.

The first powder handling module 6 includes a first silo 18 for receiving, storing and dispensing powder. A vacuum subsystem 20 induces a gaseous stream flow from the print engine 4 to the first silo 18. First powder handling module includes a first cyclone 22 that receives the gaseous stream from print engine 4 and separates the powder from the gas stream and delivers the separated powder to the first silo 18. Cyclone 22 can also be referred to as a "tornado separator" 22, a "powder separator" 22, a "cyclonic separator" or just a separator 22. Coupled to first silo 18 is a first pressure sensor 24. First pressure sensor 24 provides a signal to controller 12 which controls the first vacuum subsystem 20 in response. The controller 12 regulates the flow rate of the gaseous stream from the print engine 4 and through the cyclone 22 in response to the signal received from the pressure sensor 24.

The second powder handling module 10 is similar in structure, operation, and function to the first powder handling module 6. Second powder handling module 10 includes a second silo 18, a second vacuum subsystem 20, a second cyclone 22, and a second pressure sensor 24. The controller 12 regulates the flow of the gaseous stream from sieve 8 and through second cyclone 22 in response to signals from second pressure sensor 24. Because of their close similarity, modules 6 and 10 have common element numbers for similar internal components.

Figure 2:
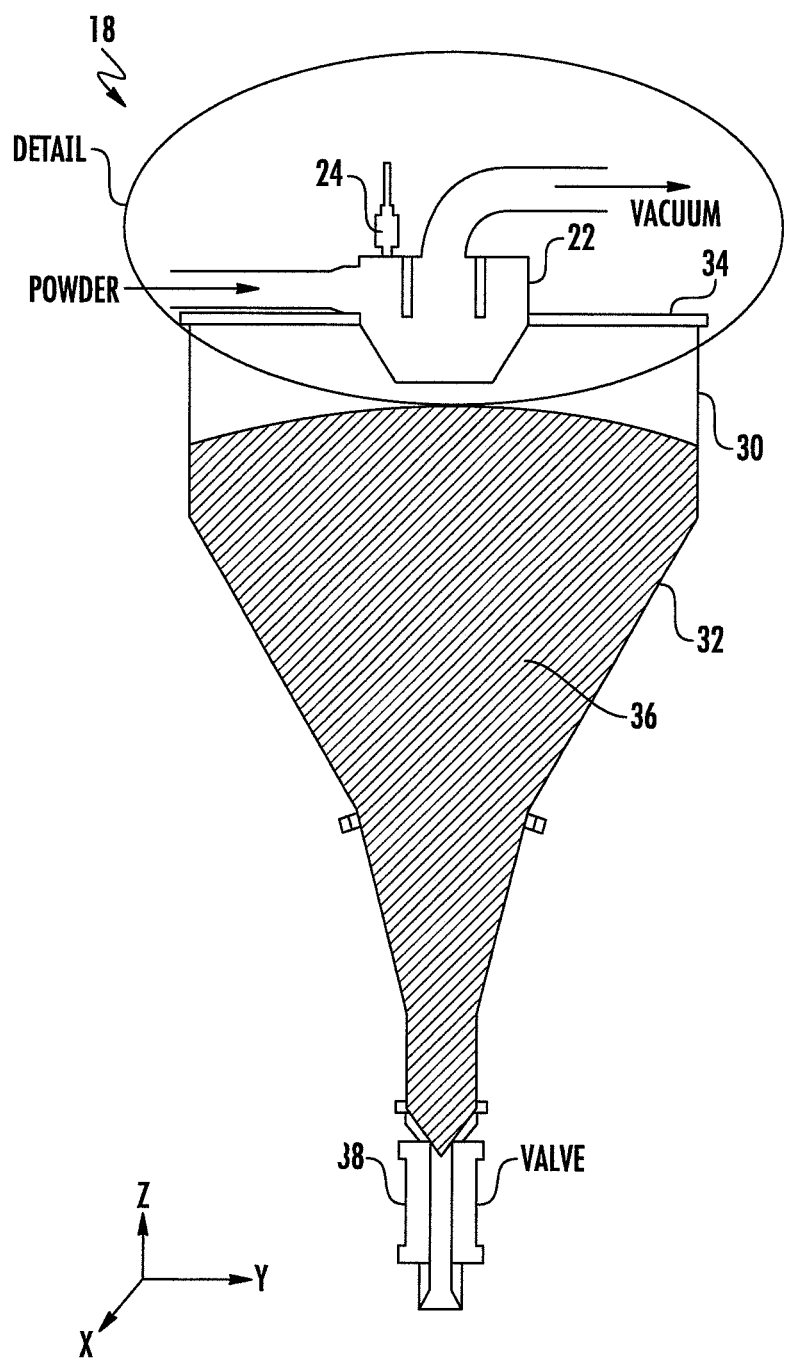
FIG. 2 is a cross-sectional view of a silo for handling powder.

FIG. 2 is a side cross-sectional view of silo 18 for handling powder. Some axes are useful in describing silo 18 and its components. Axes X, Y, and Z are mutually orthogonal. Axis Z is substantially aligned with a central axis of silo 18. A vertical direction is generally aligned with Z. The upward direction is generally in the +Z direction and the downward direction is generally in the −Z direction. Axes X and Y are generally considered to be lateral or horizontal. A distance R is a radial distance from the axis Z in cylindrical coordinates.

Silo 18 has a cylindrical upper silo portion 30 and a conical lower silo portion 32 that tapers downwardly (−Z) from the upper silo portion 30. The upper silo portion 30 includes a lid 34 that closes the top of silo 18. Mounted to the lid 18 is powder separator 22.

Powder separator 22 can be referred to as a tornado separator 22 or a cyclone 22 because it functions by allowing powder 36 to spiral downwardly as it slows down in passing through powder separator 22. The powder 36 falls out of a lower end of powder separator 22 and is stored in the silo 18. The lower end 38 of silo 18 is a valve 38 for retaining or releasing the powder 36.

Figure 3:
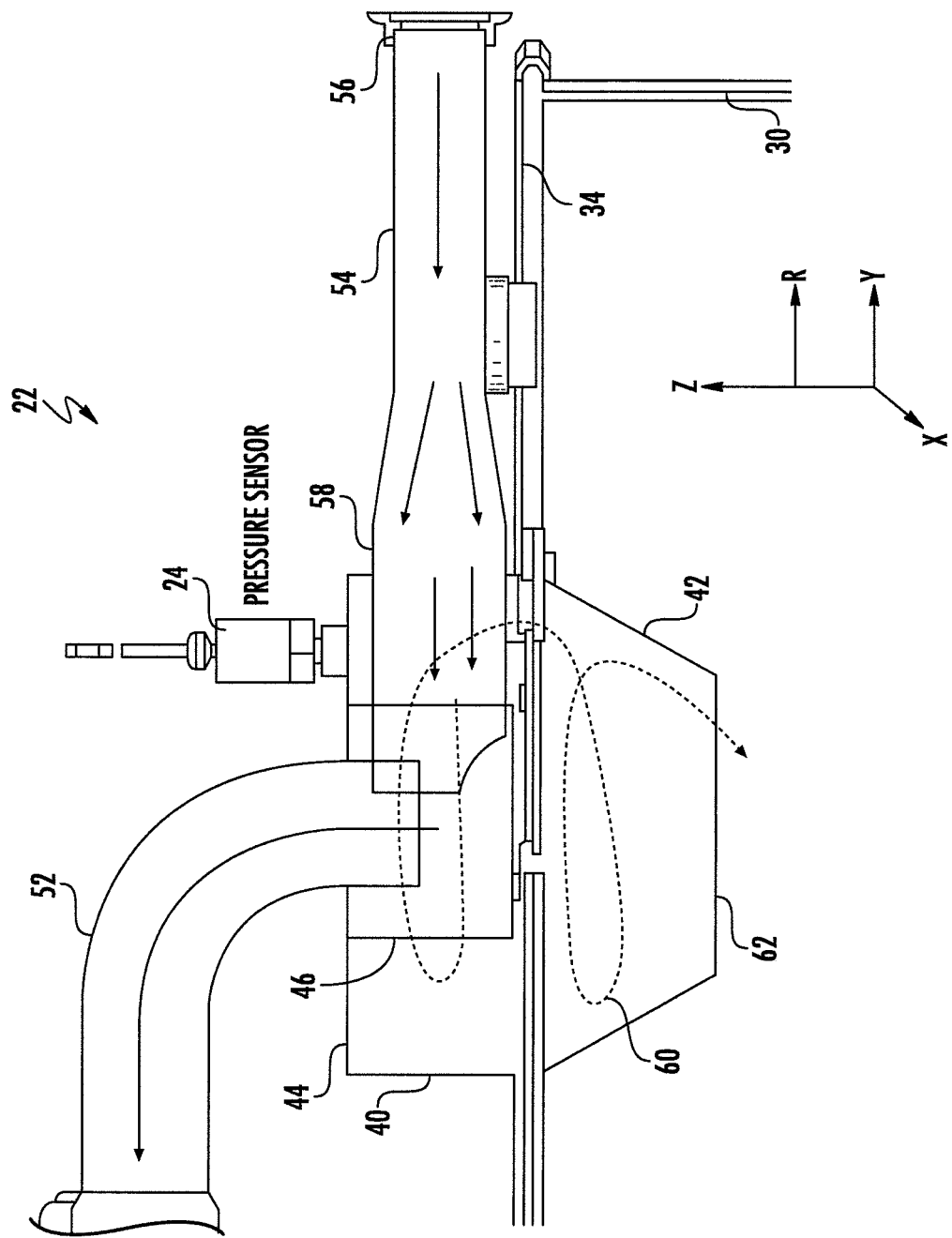
FIG. 3 is a cross-sectional detailed view of a powder separator taken from a detail indication of FIG. 2.

FIG. 3 is a side cross-sectional view depicting powder separator 22 in and taken from the "DETAIL" indication of FIG. 2. Powder separator 22 has a cylindrical upper separator portion 40 and a conical lower separator portion 42 that tapers downwardly from the upper separator portion 40. In the illustrated embodiment, the lower separator portion 42 defines a truncated cone. Depending downwardly from a top 44 of the upper separator portion 40 is a cylindrical shroud 46.

Figure 4:
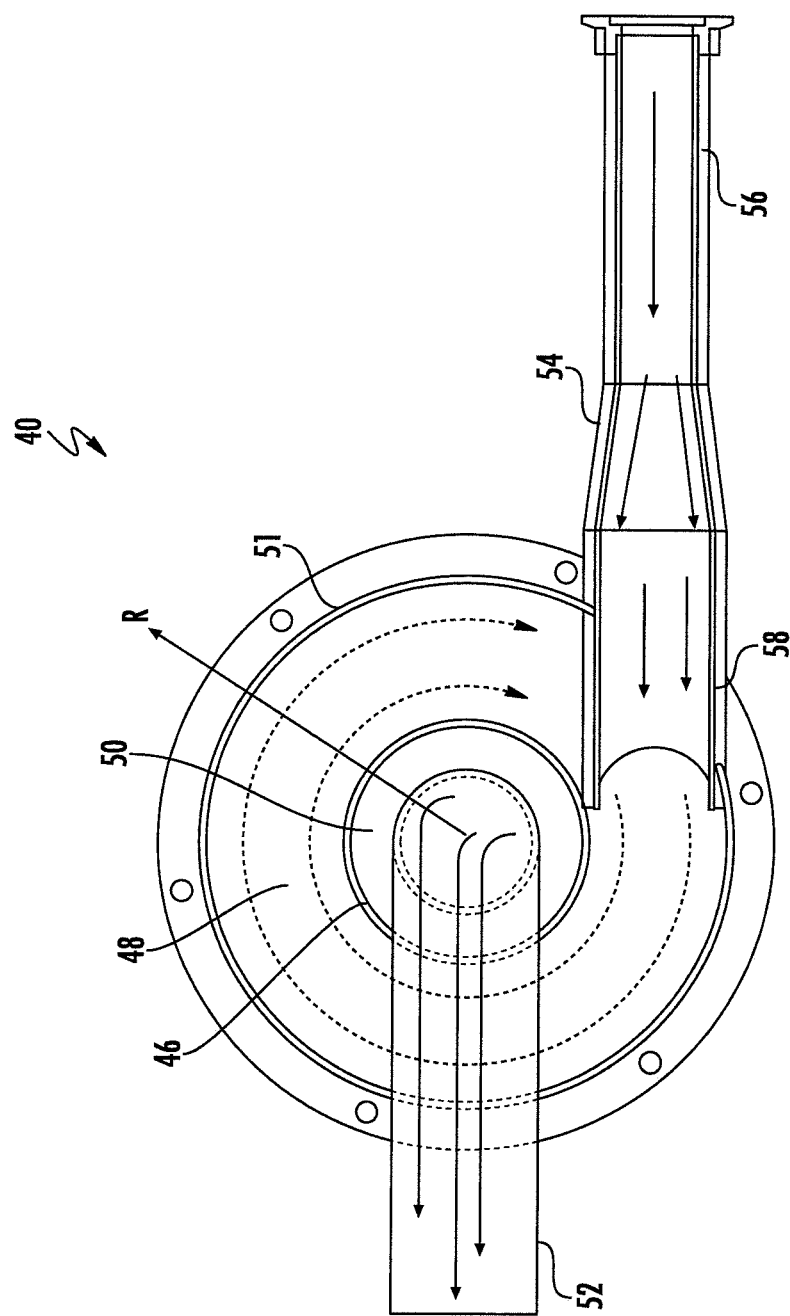
FIG. 4 is a cutaway schematic view of a cylindrical upper portion of a powder separator.

FIG. 4 is a top cutaway view of the upper separator portion 40. The shroud 46 divides the upper separator portion 40 into two cavities including an outer annular cavity 48 and an inner circular cavity 50. The outer annular cavity 48 is radially bounded by a cylindrical outer wall 51 and the cylindrical shroud 46. Powder separator 22 includes a vacuum outlet 52 that extends upwardly and laterally from the top 44 of the upper separator portion 40. The vacuum outlet 52 is coupled to vacuum subsystem 20 (see FIG. 1).

Powder separator 22 includes a powder receiving inlet 54 that is coupled to the upper separator portion 40. Power receiving inlet 54 includes a first portion 56 having a first inside diameter and widens to a second portion 58 having a second inside diameter that is greater than the first inside diameter. In one embodiment, the second inside diameter is about 50% greater than the first inside diameter. The powder receiving inlet 54 is coupled to a source of powder which can be excess powder from print engine 4 or separated powder in sieve 8 (see FIG. 1).

Powder separator 22 also includes pressure sensor 24 (see FIGS. 2 and 3) mounted to a circular or annular top 44 of the upper separator portion 40. The pressure sensor 24 is coupled to controller 12 (FIG. 1). Controller 12 thereby monitors the gas pressure of the second portion 58 of powder receiving inlet 54 or the outer annular cavity 48 of the upper separator portion 40.

Vacuum applied to vacuum outlet 52 induces a gaseous flow through the powder receiving inlet 54, through the upper separator portion 40 of powder separator 22 and out the vacuum outlet 52. When powder 36 is being transported into the first portion 56 of the powder receiving inlet 54 it is entrained in the gaseous flow. The entrained powder 36 enters the first portion 56. As the powder receiving inlet 54 widens, the velocity of the gas decreases. The slower velocity of gas that enters the outer annular cavity 48 increases a percentage of powder that will follow a helical path 60 that descends downwardly along the conical lower separator portion 42 of powder separator 22 before the powder falls out a lower end 62 of the powder separator 22 and into the silo 18.

By separating the outer annular cavity 48 from the inner circular cavity 50, the shroud 46 reduces the amount of entrained powder that will be pulled in to the vacuum outlet 52. This reduces powder reaching vacuum subsystem 20 which will have a replaceable filter (not shown) that traps remaining powder. This reduction in powder increases the life of the replaceable filter and reduces required maintenance of printing system 2.

As the powder 36 follows the helical path 60 along an inside surface of the lower separator portion 42 of powder separator 22, the flow velocity decreases due to frictional energy losses. The rotational motion along path 60 keeps the powder moving and gravity moves it to the lower end 62 of the lower separator portion 42. Lower end 62 defines an opening (not shown) through which the powder exits powder separator 22 and then falls into the silo 18.

The specific embodiments and applications thereof described above are for illustrative purposes only and do not preclude modifications and variations encompassed by the scope of the following claims.

What I claim is:

1. A three dimensional (3D) printing system comprising:
   a three dimensional print engine including a build chamber coupled to a supply chamber;
   a first silo configured to be coupled to the supply chamber for handling powder further including:
   an upper silo portion for receiving powder entrained by a gaseous stream, the upper silo portion including a vacuum outlet, and a cyclonic powder separator for removing powder from the gaseous stream whereby it exits from the powder separator in a downward direction;
   a pressure sensor mounted to an annular top of the powder separator; and
   a lower silo portion tapering in the downward direction toward a lower end from the upper silo portion, the lower end including a valve for dispensing the powder;
   a vacuum subsystem coupled to the vacuum outlet; and
   a controller coupled to the pressure sensor and the vacuum subsystem, the controller configured to receive a signal from the pressure sensor and to operate the vacuum subsystem to maintain a controlled flow rate of the gaseous stream.

2. The three dimensional (3D) printing system of claim 1 wherein pressure sensor is disposed to monitor the pressure within the powder separator.

3. The three dimensional (3D) printing system of claim 1 wherein the powder separator includes an upper separator portion, a lower separator portion that tapers downwardly from the upper separator portion, a powder receiving inlet that couples the gaseous stream to the upper separator portion and wherein the vacuum outlet exits from the upper separator portion.

4. The three dimensional (3D) printing system of claim 3 wherein the upper separator portion includes a downwardly extending shroud that separates the powder receiving inlet from the vacuum outlet.

5. The three dimensional (3D) printing system of claim 3 wherein the powder receiving inlet includes a first portion that has a first inside diameter and a second portion that has a second inside diameter that is greater than the first inside diameter.

6. The three dimensional (3D) printing system of claim 3 wherein the pressure sensor is mounted to the upper separator portion.

7. The three dimensional (3D) printing system of claim 1 further comprising a sieve disposed to receive powder from the lower end of the silo.

8. The three dimensional (3D) printing system of claim 7 further comprising:
   a second silo including a second pressure sensor disposed to receive powder from the sieve; and
   a second vacuum subsystem coupled to the second silo, the second pressure sensor and the second vacuum subsystem are coupled to the controller whereby the controller controls a gaseous flow rate between the sieve and the second silo.

9. The three dimensional (3D) printing system of claim 8 further comprising a print engine disposed to receive powder from the second silo and wherein the first silo is disposed to receive excess powder from the print engine.

* * * * *